US009906046B2

(12) United States Patent
Friedmann

(10) Patent No.: US 9,906,046 B2
(45) Date of Patent: Feb. 27, 2018

(54) APPARATUS AND METHOD FOR WIRELESSLY TRANSMITTING ENERGY

(71) Applicant: Wittenstein AG, Igersheim (DE)

(72) Inventor: Jan Friedmann, Giebelstadt (DE)

(73) Assignee: Wittenstein SE, Igersheim (DE)

( * ) Notice: Subject to any disclaimer, the term of this patent is extended or adjusted under 35 U.S.C. 154(b) by 658 days.

(21) Appl. No.: 14/456,599

(22) Filed: Aug. 11, 2014

(65) Prior Publication Data

US 2015/0042174 A1 Feb. 12, 2015

(30) Foreign Application Priority Data

Aug. 12, 2013 (DE) .......................... 10 2013 108 732

(51) Int. Cl.
*H02J 5/00* (2016.01)
*H02J 7/02* (2016.01)
*H02J 17/00* (2006.01)

(52) U.S. Cl.
CPC .............. *H02J 5/005* (2013.01); *H02J 7/025* (2013.01); *H02J 17/00* (2013.01)

(58) Field of Classification Search
CPC ........... H02J 5/005; H02J 7/025; H01F 38/14; H02M 3/3376; Y02B 70/1433
(Continued)

(56) References Cited

U.S. PATENT DOCUMENTS

2008/0082095 A1 4/2008 Shores et al.
2010/0063347 A1* 3/2010 Yomtov .................. A61M 1/10
600/17

(Continued)

FOREIGN PATENT DOCUMENTS

JP 2005329226 A 12/2002
JP 2011045195 A 3/2011
(Continued)

OTHER PUBLICATIONS

Paulo Cesar Crepaldi et al.: Evaluation of Maximum Voltage or Maximum Link Distance on Implantable Devices. DOI: 10.5772/48648, Biomedical Engineering—Technical Applications in Medicine, edited by Radovan Hudak, Marek Penhaker and Jaroslav Majernik, ISBN 978-953-51-0733-0, published Sep. 6, 2012, http://www.intechopen.com/download/pdf/38774.
(Continued)

*Primary Examiner* — Thienvu Tran
*Assistant Examiner* — David M Stables
(74) *Attorney, Agent, or Firm* — Bachman & LaPointe, PC

(57) ABSTRACT

Method for wirelessly transmitting energy from a primary device (1) to an implantable secondary device (2), wherein the primary device includes a primary coil (11) and the secondary device (2) includes a secondary coil (12) for electromagnetic interaction with the primary coil (11), with a control process which includes: measuring a primary current flowing through the primary coil (11) and a primary voltage applied to the primary coil, calculating a secondary current of the secondary coil (12) and a secondary voltage of the secondary coil (12) on the basis of the measured primary current and the measured primary voltage, comparing the calculated secondary current with a desired secondary current and/or the calculated secondary voltage with a desired secondary voltage, predefining a desired primary current and a desired primary voltage on the basis of the comparison, and operating the primary coil with the desired primary voltage and the desired primary current in order to transmit energy to the secondary coil (12).

11 Claims, 2 Drawing Sheets

(58) Field of Classification Search
USPC .................. 307/11, 104; 320/108; 702/62
See application file for complete search history.

(56) References Cited

U.S. PATENT DOCUMENTS

| | | |
|---|---|---|
| 2011/0101790 A1 | 5/2011 | Budgett |
| 2012/0095531 A1 | 4/2012 | Derbas et al. |
| 2013/0119773 A1* | 5/2013 | Davis .................. H02J 5/005 307/104 |

FOREIGN PATENT DOCUMENTS

| | | |
|---|---|---|
| WO | 2009091267 A2 | 7/2009 |
| WO | 2010042056 A1 | 4/2010 |

OTHER PUBLICATIONS

European Search Report for European Application No. 14180230.6 dated Dec. 1, 2014.

* cited by examiner

APPARATUS AND METHOD FOR WIRELESSLY TRANSMITTING ENERGY

BACKGROUND OF THE INVENTION

The invention relates to a method for wirelessly transmitting energy and to an apparatus for wirelessly transmitting energy.

The prior art discloses energy transmission systems which can transmit energy from a primary circuit to a secondary circuit. WO 2009/091267 A2 provides an example of such prior art.

In order to monitor the transmission of energy and to set the transmission power or transmission frequency or other parameters, methods from the prior art use a return channel which is used to transmit information relating to the secondary current in the secondary coil. This information can then be used to carry out a control process on the primary side. Such permanent data transmission may consume resources and reduce the control speed or control accuracy since the transmission may result in a time delay or consumes energy.

The object of the invention is to specify improved apparatuses and methods for transmitting energy. In particular, the intention is to make it possible to transmit energy in a reliable, flexible or resource-saving manner.

SUMMARY OF THE INVENTION

Typical embodiments of the invention relate to a method for wirelessly transmitting energy from a primary device to an implantable secondary device. The primary device comprises a primary coil, which is also referred to as a primary coil herein, and the secondary device comprises a secondary winding, which is also referred to as a secondary coil herein. The secondary coil and the primary coil are intended for electromagnetic interaction in order to transmit energy. The secondary device is suitable or intended, in particular, for intracorporal operation.

Typical methods provide for a primary current flowing in the primary coil and a primary voltage applied to the primary coil to be measured and for these two measured values to be used to calculate a secondary current of the secondary coil and a secondary voltage of the secondary coil. In this case, recourse is typically had to a calculated mutual inductance and a transfer function. In typical embodiments, the secondary current or the secondary voltage is calculated solely using the measured values on the primary side, that is to say the primary current and the primary voltage, using parameters of the primary device and of the secondary device. Such parameters should be understood as meaning the following variables, for example: capacitance C_1 of the primary circuit in which the primary coil is arranged, inductance L_1 of the primary coil, capacitance C_2 of the secondary circuit in which the secondary coil is arranged, resistance R_1 of the primary circuit, inductance L_2 of the secondary coil, resistance R_2 of the secondary circuit, resonant frequency f_res of the primary circuit and of the secondary circuit or, as a derived variable, the mutual inductance M.

The secondary current or the secondary voltage is typically calculated without recourse to measured values of the secondary side, in particular without recourse to a measured secondary current or a measured secondary voltage applied to the secondary coil. In this manner, a return channel is rendered superfluous or can be used for checking and tuning purposes, for example for checking whether the calculation is correct.

In typical methods, the calculated secondary current is compared with a desired secondary current or the calculated secondary voltage is compared with a desired secondary voltage. On the basis of this comparison or these comparisons, a desired primary current or a desired primary voltage through the primary device on the primary side is predefined and the primary coil is operated with the desired primary voltage or the desired primary current in order to transmit energy to the secondary coil. Other influencing variables for determining the desired primary current or the desired primary voltage are required energy on the opposite side and properties of the transmission path such as the mutual inductance.

A mutual inductance of the primary coil with respect to the secondary coil is typically determined. In typical embodiments, the primary coil is energized with a predefined primary current. The primary current is typically kept constant in order to determine the mutual inductance. Furthermore, the primary voltage applied to the primary coil is measured. The transfer function or the mutual inductance is used to calculate the secondary current or the secondary voltage. The mutual inductance M can typically be calculated by using the following formula:

$$M = \left| \frac{\sqrt{I_1 - C_1 U_1 s + C_1 L_1 I_1 s^2 + C_1 R_1 I_1 s} * \sqrt{C_2 R_2 s + C_2 * R_L s + C_2 L_2 s^2 + 1}}{\sqrt{C_1 C_2 I_1 s^4}} \right|$$

where $$s = f_{res} * 2 * \pi * i$$

C, L and R denote the capacitance C, the inductance L and the resistance R of the primary circuit, with subscript "1", and of the secondary circuit, with subscript "2".

In this case, the formula is adapted to the use of series resonant circuits. The formula should be accordingly changed when using other topologies, for example parallel resonant circuits.

In typical embodiments, secondary variables can be determined on the basis of primary variables with the aid of a transfer function TF which represents a ratio of an input variable to an output variable. The transfer functions are derived from the system-describing differential equations with the aid of Kirchhoff's loop rules:

$$U_1(t) = R_1 I_1 + \frac{1}{C_1} \int I_1 dt + \frac{L_1 dI_1}{dt} - \frac{M dI_1}{dt}$$

$$U_2 = R_2 I_2 + \frac{1}{C_2} \int I_2 dt + \frac{L_2 dI_2}{dt} - \frac{M dI_2}{dt} = 0$$

In typical embodiments, a transfer function TF as a ratio of the secondary current to the primary voltage is thus calculated using the following formula:

$$TP = \frac{I_2}{U_1}$$

with

-continued $$TP = \frac{as^3}{bs^4 + cs^3 + ds^2 + es - 1}$$

where $a = -C_1 C_2 M;$ $b = C_1 C_2 M^2 - C_1 C_2 L_1 L_2;$ $c = -C_1 C_2 L_1 R_2 - C_1 C_2 L_2 R_1 - C_1 C_2 L_1 R_L;$ $d = -C_1 L_1 - C_2 L_2 - C_1 C_2 R_2 R_1 - C_1 C_2 R_1 R_L;$ $e = -C_1 R_1 - C_2 R_2 - C_2 R_L;$ $s = f_{res} * 2 * \pi;$ Other formulas are used in further embodiments, in which case it is possible to convert said formulas, in particular.

The mutual inductance or the transfer function is typically calculated with the exclusion of recourse to a measured secondary current or a measured secondary voltage. However, in typical embodiments, it is possible to have recourse to transmitted measured values from the secondary side in order to check the calculated mutual inductance or the transfer function. The control process is typically carried out independently of real-time feedback of a measured value for the secondary current, also called secondary current measured value, or independently of real-time feedback of a measured value for the secondary voltage, also called secondary voltage measured value. None of these values is typically fed back in real time. This affords the advantage that the control process can be quick since it is possible to dispense with time-consuming feedback of measured values from the secondary side. This also analogously applies to the transfer function and the mutual inductance which, in embodiments, are determined independently of real-time feedback of a secondary current measured value or independently of real-time feedback of a secondary voltage measured value.

In typical methods of embodiments, an item of information relating to a power required by the secondary device or an item of information relating to a transmitted power is transmitted from the secondary device to the primary device. This makes it possible to adapt the transmission of energy to a requirement. The secondary device typically monitors the transmitted power and transmits an item of information relating to the transmitted power or relating to a change in the transmitted power to the primary device. Such a change may occur, in particular, when moving the primary device. In typical embodiments, information is therefore transmitted from the secondary side to the primary side only in the event of a deviation from normal operation or in the event of a fault. In methods of the invention, signals are typically output to the user or a user is requested to reposition the primary device if information relating to a change in the transmitted power is transmitted. In this manner, the method is very reliable and not very susceptible to faults.

In typical methods of embodiments, the comparison of the calculated secondary current with the desired secondary current or the calculated secondary voltage with the desired secondary voltage is respectively used as an input signal for a PI controller in order to determine the desired primary current or the desired primary voltage. This provides a control loop which reliably supplies the secondary device with energy. In typical embodiments, the primary coil is controlled with a pulse-width modulation method (PWM method). Control with a pulse-width modulation method is typically carried out in typical embodiments by controlling the current of the primary coil to a desired primary current. In some embodiments, the amplitude of the desired primary voltage may be predefined. This enables simple control with simple means. Pulse widths of up to 70%, typically of up to 50%, are used, in particular, during pulse-width modulation. In such ranges, there is a sufficiently linear relationship between the primary current and the duty ratio.

Another aspect of the invention relates to an apparatus for wirelessly transmitting energy, having a primary device and an implantable secondary device, the apparatus being set up to carry out a method in one of the typical embodiments described herein.

Advantages of typical methods over methods from the prior art are a fast control response and the elimination of the need to quickly transmit measured values from the secondary device to the primary device.

Typical methods have a transmission rate for measured values of the secondary side, for example the transmitted power, the desired secondary voltage or the secondary current, which is less than 3 Hz, typically less than 1 Hz, and less than 0.5 Hz in some embodiments of the invention. In the example of 0.5 Hz, this would mean that a measured value or a pair of measured values or a set of measured values, which has been determined at a particular time, is transmitted only every two seconds. This saves a lot of energy on the secondary side. Furthermore, the computing capacity on the side of the implant or the secondary device can be restricted, with the result that an energy consumption can be reduced up to a factor of 100. Furthermore, the control process is also more robust since a connection loss does not entail any relevant interference with the control process. This increases the safety. This may be of interest, in particular, in the case of implants as the secondary device.

In typical exemplary embodiments, the external diameter of the secondary coil is less than 10 cm or less than 4 cm. Small coil sizes facilitate implantability. In conventional exemplary embodiments, the external diameter of the primary coil is less than 30 cm, typically less than 10 cm, or less than 4 cm. The primary device is typically portable. Small primary coil diameters enable manageable devices which can be carried by patients. At the point of maximum coupling or the minimum or optimal distance between the primary coil and the secondary coil, the ratio between the coil radius and the transmission path is at most 10:1, typically at most 3:1 or typically at most 1:1. This enables small coils.

BRIEF DESCRIPTION OF THE DRAWINGS

Further advantages and features of preferred embodiments of the invention are explained below using the accompanying drawings, in which.

DETAILED DESCRIPTION

Typical embodiments are described below using the figures, in which case the invention is not restricted to the exemplary embodiments, but rather the scope of the invention is determined by the claims.

Figure 1:
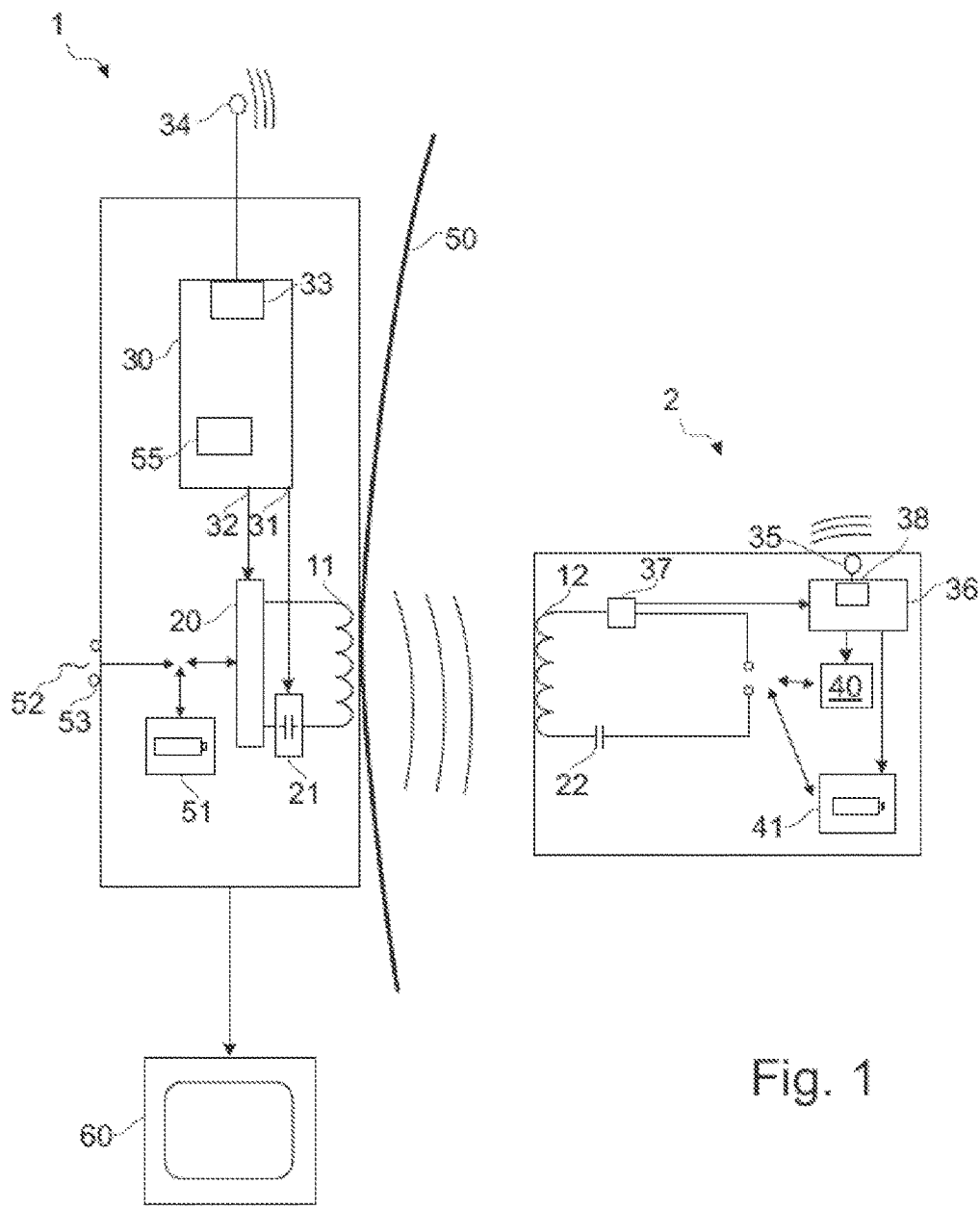
FIG. 1 shows a schematic illustration of a typical embodiment of a primary device in combination with further elements for explaining the invention.

FIG. 1 shows an exemplary embodiment comprising a primary device 1 and a secondary device 2. The primary device 1 has a primary circuit in which a first winding 11 is arranged. The secondary device 2 has a secondary circuit in which a second winding 12 is arranged.

In embodiments, the secondary device is intended to be arranged in a machine, for example at a location which is difficult to access, or in an animal body or in an area with substances which are hazardous to health. Typical embodiments of the invention provide, in particular, more adjustable, switchable or complex components in the primary device than in the secondary device in order to make the secondary device as simple as possible. In further embodiments, however, switchable components are also provided in the secondary device. Secondary devices of typical embodiments can be implanted or are intended to be arranged inside a human body or an animal.

The primary circuit has a transmission amplifier 20 with an H-bridge circuit which typically makes it possible to set the transmission frequency. The primary circuit also has, in the series connection, a variable capacitance 21 which is in the form of a capacitor matrix in the exemplary embodiment illustrated. The capacitor matrix has a 6-bit circuit, with the result that 64 possible capacitance values can be controlled. In typical embodiments, a 6-bit matrix suffices to ensure sufficient adjustability of the resonant frequency of the primary circuit having the variable capacitance 21 and the first winding 11. In further embodiments, a 7-bit matrix or a matrix provided with yet more possibilities is provided. Furthermore, it is also possible to use an infinitely variable capacitor or a capacitor matrix with fewer switching possibilities. For the sake of completeness, reference is also made to the second capacitor 22 of the secondary circuit which has a fixed capacitance in typical embodiments. In this manner, the secondary device 2 can be as simple as possible. Alternatively, however, it is also possible to likewise use a capacitor matrix or a variable capacitor instead of the fixed second capacitor 22 on the secondary side.

In order to check, that is to say monitor, regulate or control, different functions of the primary device 1 and possibly also of the secondary device 2, the primary device 1 comprises a checking unit 30. The checking unit 30 can set the transmission frequency of the amplifier 20 and also the capacitance of the capacitor matrix 21 via signal outputs 31 and 32. The checking unit 30 also comprises a radio-frequency transmission unit 33 which can communicate via a first antenna 34 using radio-frequency waves. Similarly, the secondary device has a second radio-frequency antenna 35 which is connected to a second transmission unit 38 arranged in a checking block 36. The checking block 36 is part of the secondary device 2 and is used, in particular, to detect the current in the secondary circuit using a current sensor 37. Furthermore, the checking block 36 is suitable for establishing a connection between the secondary circuit and a load 40 or a connection between the secondary circuit and a second battery 41.

Typical embodiments have a load or a plurality of different load modules. A typical load is, for example, a pump, an actuator, a pulse generator or a drive for an actuator, each for use in a hazardous environment, in particular, or designed to be implantable.

In the exemplary embodiment in FIG. 1, the secondary device 2 is behind a physical boundary surface 50, for example a surface of a body, a shelter or a machine, as viewed from the primary device 1. The primary device 1 can be moved, with the first winding 11, on the predefined surface 50 in order to improve energy transmission from the first winding 11 to the second winding 12 and therefore from the primary device 1 to the secondary device 2. The sequence in which such movements may be provided in typical embodiments is explained in connection with typical methods.

The primary device 1 furthermore has a first battery 51 which, like the second battery 41, can be recharged. However, the first battery 51 is provided with a substantially larger capacity than the second battery 41, typically with at least three times or 10 times the capacity. In typical exemplary embodiments, the second battery 41 is used only to bridge short periods of time, for example during which energy transmission is problematic. In contrast, the first battery 51 can also be used to ensure that the entire apparatus is supplied with energy over a relatively long period during which the primary device 1 is not connected to a public supply network 52. The primary device 1 comprises connections 53 which can be used to connect the primary device to the public supply network 52, for example in order to operate the entire primary device 1 and therefore also the secondary device 2 via the energy transmission path or else in order to recharge the first battery 51. The first battery or the public network supplies the primary device with energy. The primary device also comprises a memory 55 arranged in the checking unit 30, for example for storing functions or parameters of the primary device 1 and of the secondary device 2. The checking unit is also set up to carry out a mutual inductance and a transfer function using the formulas described in this application.

The primary device 1 can be connected to an evaluation unit 60 which can be used to output optical or acoustic instructions for positioning the primary device 1 on the boundary surface 50 to a user. Information relating to a transmitted power or relating to operating parameters can also be represented.

The load in embodiments can change in a foreseeable, predictable or unforeseeable manner for different reasons. In the case of a drive or a servomotor, it is thus possible for different energy consumptions to result for different operating situations, for example quickly or slowly, acceleration or braking. Furthermore, provision may be made to distinguish between a first operating state in which a rechargeable battery of the secondary device is not charged, and a second operating state in which the rechargeable battery is charged. In addition, it is possible to distinguish between an operating state in which there is a network connection of the primary device, and an operating state in which there is no network connection of the primary device. These operating states can be expressed by the operating parameter.

Figure 2:
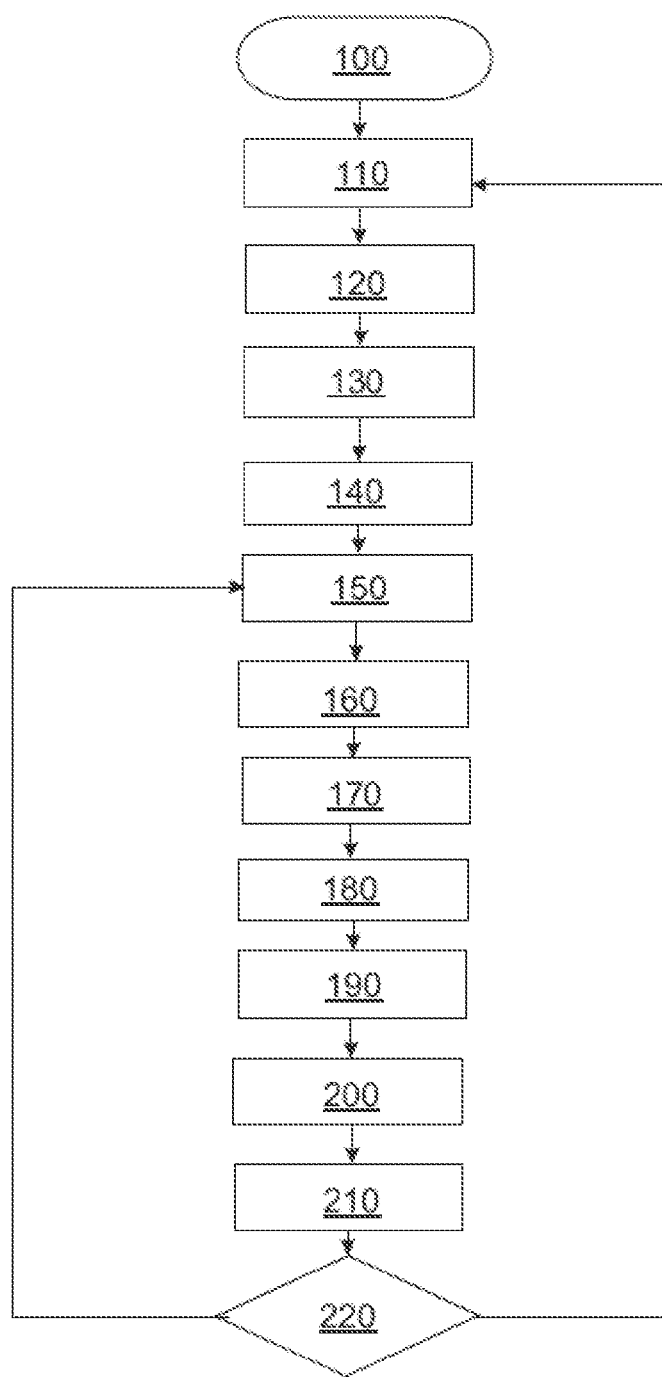
FIG. 2 schematically shows a basic flowchart of an embodiment of a typical method.

FIG. 2 shows an exemplary embodiment of a method. The embodiment shown in FIG. 1 is typically used to carry out the method. In principle, however, the method can also be carried out with other embodiments.

The method starts in a block 100 in a manner triggered by an energy request or triggered by a user. A constant current for the primary coil is then predefined in a block 110. For example, 0.5 amperes or else 1 ampere can be predefined as the constant current for the primary coil in step 110. A control process is then carried out in a block 120, in which case a PI controller is operated with the desired value for the constant current and with the measured actual value of the current of the primary coil as an input signal. The output signal from the PI controller is used to set pulse-width modulation or an intermediate circuit voltage, with the result that the actual current in the primary coil approaches the desired current of the primary coil.

In a subsequent block 130, a mutual inductance M between the primary coil and the secondary coil is calculated. In typical embodiments, the mutual inductance M is calculated solely using measured values obtained at the primary coil. The mutual inductance M is typically measured solely using the measured current of the primary coil and the voltage applied to the primary coil. For this purpose, recourse is had to the formulas which are represented in this application and can also be used in other forms. In typical embodiments, recourse is not had to measured values of the secondary coil. In further methods, calculation results can be checked using measured values of the secondary coil.

In a subsequent block 140, a transfer function TF is calculated according to the formula which is stated herein and can likewise be converted. The process then continues with the measurement of the primary current and the primary voltage at the primary coil, block 150.

The current of the secondary coil, that is to say the actual secondary current, is calculated (block 160) with the measured values with the aid of the transfer function, in which case it is possible to use, for example, the following transfer functions TF_1 and TF_2 which can be derived from the differential equations for U_1 (t) and U_2 described herein:

$$TF_1 = \frac{I_2}{U_1}$$

In the subsequent block 170, a voltage on the secondary side, that is to say an actual secondary coil voltage, is calculated using the following formula:

$$TF_2 = \frac{U_2}{I_1}$$

In a block 180, the calculated actual secondary coil voltage is compared with a desired secondary coil voltage and the calculated actual secondary coil current is compared with a desired secondary coil current in order to calculate the deviations $\Delta U_2$, $\Delta I_2$.

The values $\Delta U_1$, $\Delta I_1$ are then determined (blocks 190 and 200) from the pair of values $\Delta U_2$, $\Delta I_2$ with the aid of the transfer functions TF_1 and TF_2 (see above).

In block 210, the desired values for the primary current and for the primary voltage are accordingly adapted. In embodiments with only one controllable variable, primary current or primary voltage, a desired value change for the primary current or the primary voltage is calculated with the aid of the formulas $$\Delta P_1 = \Delta U_1 * \Delta I_1$$

and $$P = I^2 * Z_L$$

where Z_L is the total impedance of the coupled resonant circuits.

The desired value changes are each supplied to the PI controllers or the one desired value change is supplied to the PI controller (in the case of a controllable variable on the primary side). In this manner, a power which results in a voltage that is at least substantially equal to the desired secondary coil voltage being applied to the coil on the secondary side is applied to the primary coil.

The method can repeatedly return to block 150 in order to improve the control quality. Furthermore, a block 220 can enquire whether there is a request from the secondary device, for example whether the secondary device needs another required power, or the secondary device can transmit information relating to the transmitted power, which is monitored by the secondary device, to the primary device. Information relating to the change in the transmitted power may indicate, for example, that the position of the primary device with the primary coil has moved. In typical methods, an adaptation is carried out in such a case on the primary side; for example, the value of a capacitance of the circuit of the primary coil can be changed or a transmission frequency at which the primary coil is operated can be changed. For this purpose, a return channel from the secondary device to the primary device can be used in block 220. The method returns to block 150 if only more or less power is demanded on the secondary side, for example. In contrast, if the method determines in block 220 that a change in the transmission path must have occurred, for example as a result of the primary coil moving relative to the secondary coil, the method returns to block 110 in which the process again starts to check the mutual inductance (block 130) and the transfer function (block 140).

The invention claimed is:

1. Method for wirelessly transmitting energy from a primary device to an implantable secondary device, wherein the primary device comprises a primary coil and the secondary device comprises a secondary coil for electromagnetic interaction with the primary coil, with a control process which comprises:
   (a) measuring a primary current flowing through the primary coil and a primary voltage applied to the primary coil,
   (b) calculating a secondary current of the secondary coil and a secondary voltage of the secondary coil on the basis of the measured primary current and the measured primary voltage,
   (c) comparing the calculated secondary current with a desired secondary current and/or the calculated secondary voltage with a desired secondary voltage,
   (d) predefining a desired primary current and a desired primary voltage on the basis of the comparison, and
   (e) operating the primary coil with the desired primary voltage and the desired primary current in order to transmit energy to the secondary coil.

2. Method according to claim 1, including determination of a mutual inductance of the primary coil with respect to the secondary coil on the basis of a predefined primary current through the primary coil and a primary voltage applied to the primary coil, the transfer function being used to calculate the calculated secondary current and/or the calculated secondary voltage of the secondary coil.

3. Method according to claim 1, including determination of a transfer function on the basis of the mutual inductance, the mutual inductance being used to calculate the calculated secondary current and/or the calculated secondary voltage of the secondary coil.

4. Method according to claim 3, including determining the transfer function and the mutual inductance independently of real-time feedback of a secondary current measured value and independently of real-time feedback of a secondary voltage measured value.

5. Method according to claim 1, including carrying out the control process independently of real-time feedback of a secondary current measured value and independently of real-time feedback of a secondary voltage measured value.

6. Method according to claim 1, including transmitting information relating to a power required by the secondary device from the secondary device to the primary device.

7. Method according to claim 1, including transmitting information relating to a transmitted power and/or a load from the secondary device to the primary device.

8. Method according to claim 7, including monitoring by the secondary device of the transmitted power and, in the event of a change in the transmitted power, transmitting an item of information relating to the change in the transmitted power.

9. Method according to claim 1, wherein the comparison of the calculated secondary current with the desired secondary current and/or the calculated secondary voltage with the desired secondary voltage respectively being used as an input signal for a PI controller in order to determine the desired primary current and/or the desired primary voltage.

10. Method according to claim 1, including controlling the primary coil with a pulse-width modulation method.

11. Apparatus for wirelessly transmitting energy, comprising:
   (a) a primary device which has a primary coil,
   (b) a secondary device which comprises a secondary coil which can be arranged for electromagnetic interaction with the primary coil, and
   (c) a checking unit which is set up to carry out a method according to claim 1.

* * * * *